(12) United States Patent
Steg et al.

(10) Patent No.: US 12,215,752 B1
(45) Date of Patent: Feb. 4, 2025

(54) VIBRATION ISOLATOR WITH OVERLOAD PROTECTION

(71) Applicant: BLUE CANYON TECHNOLOGIES INC., Boulder, CO (US)

(72) Inventors: Stephen Steg, Erie, CO (US); Brett Bender, Lafayette, CO (US)

(73) Assignee: BLUE CANYON TECHNOLOGIES LLC, Lafayette, CO (US)

( * ) Notice: Subject to any disclaimer, the term of this patent is extended or adjusted under 35 U.S.C. 154(b) by 702 days.

(21) Appl. No.: 16/946,221

(22) Filed: Jun. 10, 2020

Related U.S. Application Data

(60) Provisional application No. 62/880,544, filed on Jul. 30, 2019.

(51) Int. Cl.
 *F16F 13/00* (2006.01)
 *B64G 1/66* (2006.01)
 *F16F 15/02* (2006.01)

(52) U.S. Cl.
 CPC .............. *F16F 13/005* (2013.01); *B64G 1/66* (2013.01); *F16F 15/022* (2013.01); *F16F 2230/0023* (2013.01); *F16F 2230/16* (2013.01)

(58) Field of Classification Search
 CPC ............. F16F 13/005; F16F 2230/0023; F16F 2230/16
 See application file for complete search history.

(56) References Cited

U.S. PATENT DOCUMENTS

| | | |
|---|---|---|
| 3,980,358 A | 9/1976 | Davis |
| 4,760,996 A | 8/1988 | Davis |
| 4,848,525 A | 7/1989 | Jacot et al. |
| 5,332,070 A | 7/1994 | Davis et al. |
| 5,482,259 A | 1/1996 | Loziuk |
| 5,775,469 A | 7/1998 | Kang |
| 6,390,254 B1 | 5/2002 | Bennett et al. |
| 7,953,523 B2 | 5/2011 | Hindle et al. |
| 7,967,282 B2 | 6/2011 | Boyd et al. |
| 8,002,094 B2 | 8/2011 | Ruebsamen et al. |
| 8,327,985 B2 | 12/2012 | Boyd et al. |
| 8,678,323 B2 | 3/2014 | Barber et al. |
| 8,899,389 B2 | 12/2014 | Smith et al. |
| 9,103,403 B2 | 8/2015 | Hadden et al. |
| 9,108,750 B2 | 8/2015 | Camarasa |
| 9,188,189 B2 | 11/2015 | Goold et al. |

(Continued)

FOREIGN PATENT DOCUMENTS

| | | |
|---|---|---|
| CN | 103587724 | 2/2014 |
| CN | 103603916 | 2/2014 |

(Continued)

*Primary Examiner* — Melody M Burch
(74) *Attorney, Agent, or Firm* — FisherBroyles, LLP; Craig W. Mueller

(57) ABSTRACT

Provided is a single degree of freedom vibration isolator/damper system capable of overload protection. The vibration isolator reduces vibration transmitted to or from an isolated spacecraft component that generates micro-vibrations. The system isolates sensitive components and vibration sources from the spacecraft. The system may consist of a 1) first spring element in series with a first damper element; 2) a second spring element in parallel with the first spring element and first damper element; and 3) a support member that serves as the overload protection device.

13 Claims, 8 Drawing Sheets

(56) References Cited

U.S. PATENT DOCUMENTS

| | | | |
|---|---|---|---|
| 9,234,561 B2 | 1/2016 | Laurens | |
| 9,273,749 B2 | 3/2016 | Goold et al. | |
| 9,416,842 B2 | 8/2016 | Martinez et al. | |
| 9,453,552 B2 | 9/2016 | Tosovsky et al. | |
| 9,458,907 B2 | 10/2016 | Goold et al. | |
| 9,475,594 B2 | 10/2016 | Barber et al. | |
| 9,670,983 B2 | 6/2017 | Martinez et al. | |
| 9,618,077 B2 | 8/2017 | Goold et al. | |
| 9,777,793 B1 | 10/2017 | Chen et al. | |
| 10,066,697 B2 | 9/2018 | Barber et al. | |
| 2006/0169132 A1* | 8/2006 | Tucker | F15B 15/14 92/52 |
| 2010/0320358 A1 | 12/2010 | Boyd et al. | |
| 2012/0241268 A1 | 9/2012 | Laro et al. | |
| 2013/0154170 A1 | 6/2013 | Davis et al. | |
| 2014/0291452 A1* | 10/2014 | Martinez | B64G 1/66 188/274 |
| 2014/0374974 A1 | 12/2014 | Goold et al. | |
| 2015/0115098 A1* | 4/2015 | Imbert | B64D 27/26 244/54 |
| 2015/0145191 A1 | 5/2015 | Smith et al. | |
| 2015/0226282 A1* | 8/2015 | Hindle | F16F 9/19 188/297 |
| 2017/0291719 A1 | 10/2017 | Lavine et al. | |
| 2019/0113138 A1* | 4/2019 | Germano | F16J 1/16 |

FOREIGN PATENT DOCUMENTS

| | | | |
|---|---|---|---|
| CN | 104500648 | 4/2015 | |
| CN | 104443436 | 5/2017 | |
| CN | 105035362 | 8/2017 | |
| EP | 2607240 | 6/2012 | |
| EP | 2524872 A1 * | 11/2012 | B64G 1/641 |
| EP | 2518366 | 8/2018 | |
| WO | WO-2018230774 A1 * | 12/2018 | E04B 1/98 |

* cited by examiner

VIBRATION ISOLATOR WITH OVERLOAD PROTECTION

This application claims the benefit of U.S. Provisional Patent Application Ser. No. 62/880,554, filed Jul. 30, 2019, the entirety of which is incorporated by reference herein.

FIELD OF THE INVENTION

Embodiments of the present invention generally relate to spacecraft vibration dampers and isolators.

BACKGROUND OF THE INVENTION

Spacecraft, such as microsatellites, often employ reaction wheel assemblies (RWAs) and control moment gyroscopes (CMGs) for attitude, torque, and momentum control. RWAs and CMGs rely on spinning components to generate torques to rotate the spacecraft or to maintain the desired attitude. Those of ordinary skill in the art will appreciate changing reaction wheel rotation speed or the spin axis orientation of a control moment gyroscope's flywheel creates a reactive torque that urges the spacecraft in a predetermined, controlled fashion. RWAs, CMGs, and other precision components (such as optical instruments and telescopes) are commonly mounted to the spacecraft via single degree of freedom struts designed to accommodate forces along their longitudinal axis. Such struts commonly have ends having spherical bearings or machined flexures. Several struts (often in groupings of 6 or 8) support the RWA/CMG, camera, sensor, or other component in a kinematically constrained manner.

Spinning flywheels of an RWA or CMG assembly are supported by ball bearings that generate vibrations that can adversely influence spacecraft components. That is, mechanical structures are never without some flaws—flywheels are never perfectly balanced, ball bearings are never perfectly round, etc. These flaws present as vibrational loads during operation that adversely affect sensor and camera precision. A rotating flywheel will generally produce vibrations commensurate with its rotational speed. RWA/CMG flywheels often spin at speeds of at least 6000 RPM, which equates to 100 rev/sec or a component vibration of 100 Hz. Designers attempt to decouple the resonance frequency of the component from their support structure, which often leads to the use of low frequency (e.g., 1-20 Hz) struts. Low-resonance support systems are well-suited for use in orbit but are not ideal during extreme loading events. More specifically, low-resonance systems are compliant and will experience high deflections during launch that allow the RWA/CMG components to "rattle," thereby damaging the RWA/CMG. It is, therefore, beneficial to provide a strut that isolates and dampens mechanical vibrations generated during high-acceleration events like launch.

U.S. Pat. No. 5,332,070 ("the '070 patent"), which is incorporated by reference herein, discusses a support system that utilizes a low resonant frequency vibration isolator that also accommodates higher component vibration frequencies. The '070 patent discloses a "three-parameter" vibration isolator that attenuates transmitted vibration along its longitudinal axis. This isolator provides acceptable isolation (as determined by its 40 dB/decade roll-off), but it employs a bellows system filled with viscous oil, so it is that expensive to manufacture and test. Secondly, this isolator has a single resonance mode, which means it is only suited to a specific stiffness value. A launch vehicle and spacecraft typically resonate between about 5-25 Hz. Thus, the strut of the '070 patent needs to be set at a resonant frequency of 25 Hz or higher to avoid dynamically coupling with the spacecraft and launch vehicle resonances. This strut resonant frequency, however, is not ideal for isolating induced vibration generated by the RWA/CMG of 100 Hz. The '070 patent also discloses a three-parameter isolator that employs two spring elements and a fluid-damper element. This fluid-damper element relies on a viscous fluid for dissipating energy as it is sheared through a small orifice. One drawback of this system is the trapped fluid volume, which is expensive to manufacture to reliably prevent leaks. A simplified damper assembly is needed that is optimal for low-cost spacecraft.

Some vibration isolators, such as disclosed in the '070 patent, utilize a "launch lock" mechanism to prevent excessive motion during launch. Launch lock mechanisms add cost and complexity and introduce a spacecraft failure point. Another drawback with launch lock mechanisms is that they allow vibrations to be transmitted through the locked vibration isolators during launch, which exposes the RWA/CMG components to damaging loads. Accordingly, some vibration isolators are "dual-mode" that function adequately during launch and normal operations. One example of such an isolator is described in U.S. Patent Application Publication No. 2010/0320358. However, the dual-mode vibration isolators currently contemplated suffer from a high degree of complexity (e.g., employing welded flexible bellows that contain fluid) and, thus, possess an unacceptable number of failure modes.

SUMMARY OF THE INVENTION

It is one aspect of some embodiments of the present invention to provide a vibration isolator that 1) is configured to carry loads in the axial direction; 2) is flexible in the cross-axial direction; 3) possess internal vibration isolation above a characteristic roll-off frequency; and 4) possess internal damping to minimize vibrations. The vibration isolator of one embodiment of the present invention provides dual mode damping to minimize loading encountered during launch, and three-parameter spring/damper damping that allows for stable control of a component post-launch. The contemplated vibration isolator is a single degree of freedom mechanical assembly that transmits forces predominantly along its length.

It is another aspect of some embodiments of the present invention to provide a vibration isolator with overload protection. More specifically, the contemplated isolator employs a plurality of springs and/or dampeners that dampen vibrational loads of a first character, a second character, and a third character. The first character loads are caused by spacecraft launch. The second character loads exceed those of the first character. The contemplated dual-mode vibration isolator includes a plurality of stops that accommodate loads of the first and second characters. The third character loads are lower and are primarily encountered in-orbit, e.g., RWA/CMG induced vibrations, solar panel rotation mechanism induced jitter, etc.

The isolator of one embodiment of the present invention generally comprises a shaft having a first end and a second end. The first and second ends of the shaft are interconnected to end fittings configured to interconnect to the spacecraft or the component, depending on the isolator's orientation. The first end of the shaft resides within a cavity associated with a first end fitting and has an outwardly extending portion. The outwardly extending portion accommodates at least one cushioning element, i.e., a stop. The stops may be provided on each side of the outwardly extending element, wherein one-stop faces a first end of the shaft, and the other stop faces the second end of the shaft. The stops are adapted to selectively engage cavity surfaces under certain loading circumstances.

A series of springs and dampers counteract loads acting on the end fittings. In one embodiment, an outer spring is positioned about the shaft and is associated with the first end fitting and the shaft near its second end. An inner spring resides within the space provided between the outer spring and the shaft. The inner spring has a first end, which may be integrated with the first end fitting, and a second end engaged to a damper. The dampener is associated with the shaft near its second end. In one embodiment, the dampener is sandwiched between a nut and the second end of the inner spring and an outer ring is positioned about the nut. The outer ring provides a connection point for the second end of the outer spring. To provide additional robustness, flexure elements are used to minimize stiffness in the lateral direction, which ensures the vibration isolator has much higher stiffness along its longitudinal axis (i.e., along the loading direction). The contemplated flexures are provided on at least one end of the vibration isolator and accommodate loads perpendicular to the loading direction and bending loads.

The springs of one embodiment have a limited elastic range. The outer spring and damper are in series, and the inner spring is in parallel with the combination of the outer spring and damper. Accordingly, if forces are small (i.e., loads of a third character), the vibration isolator will dampen and isolate vibrations utilizing the inner spring, the outer spring, and the damper. The inner spring of one embodiment has a spring constant K1 and the outer spring has a spring constant K2. The vibration isolator of one embodiment comprises machined double-helix springs, made of suitable high strength material, such as aluminum, titanium, steel, reinforced composite, etc., to set the resonant frequencies for multiple modes.

The use of "inner" and "outer" as provided herein is not limiting. More specifically, one of ordinary skill in the art will appreciate that the arrangement of springs and dampers can be altered without departing from the scope of the invention. For example, the series sub-assembly of a spring with stiffness K2 and the associated damper may be positioned about the spring with stiffness K1. Further, the terms "spring" and/or "damper" shall mean at least one spring/damper, wherein, for example, a spring/damper assemblage with the desired stiffness or dampening characteristics may be provided.

An overload protection device is also employed, which limits the force that the springs are subjected to, thereby protecting them from damage. Again, the overload protection device utilizes deformable, energy-dissipating materials, which is overload protected by end-of-travel hard stops. When the vibration isolator is exposed to loads of the second character, the overload protection device will carry axial loads above the elastic range of the inner and outer springs. The overload protection device of one embodiment includes end-of-travel "soft" stops made of rubber-like viscoelastic material sandwiched between metallic plates. The contemplated motion limiting features are used to allow large forces to be transmitted through the vibration isolator in the "launch configuration mode." When the motion limiting gap is not closed, the isolator operates in a passive "jitter isolation mode."

It is another aspect of some embodiments to provide a system free of all fluids and welded bellows, and therefore does not possess the failure modes associated with leaking fluids. That is, the contemplated vibration isolator is "dry" where no bellows or fluids are used, which is common practice in the prior art. Furthermore, the design can be made very small and compact, reducing mass and volume, which are both precious spacecraft resources.

It follows that the vibration isolators of some embodiments of the present invention are "dual-mode" and designed to satisfy two functions of high vibration attenuation for the launch environment, and low vibration attenuation for the in-orbit jitter environment. Mode 1 is the "launch configuration mode," which provides a higher axial stiffness (e.g., 20-100 Hz), thereby not interacting with the launch vehicle's resonant frequency (e.g., 5-10 Hz). Mode 1 serves the function of minimizing the transmitted random vibration from the host spacecraft to fragile RWA/CMG ball bearings, for example. This feature is beneficial because it minimizes the stresses on the RWA/CMG ball bearing interfaces, thereby allowing the ball bearings to be optimized for low drag torque and low power consumption.

In operation, a component that produces vibration, such as an RWA/CMG is isolated by six (or more) single degree of freedom vibration isolators. Alternatively, a payload may be isolated on these same six (or more) single degree of freedom isolators. When the component experiences loads of the first character, i.e., during launch, the vibration isolator experiences displacements of higher magnitudes, and portions of the shaft will engage the motion-limiting stop. This interaction protects the three parameter spring-damper system from damage by allowing loading to bypass it through the shaft. The stops may be made of a viscoelastic material, which will also accommodate some load. If the load of the first character is greater than a predetermined amount, however, a hard stop is provided within the cavity that will interact with the outwardly extending portion of the shaft. This ensures that loads of the second character do not over-compress the motion-limiting stop, protecting it and the spring-damper system from damage. The predetermined maximum load of the first character is selected such that loads of the second character can occur only through anomalous testing. This aspect of some embodiments of the invention protects the strut from damage when exposed to loads of the second character, even though an interconnected RWA/CMG may be damaged. Some embodiments of the present invention omit a hard stop because the stiffness of the viscoelastic motion-limiting stops increase as they are compressed in effect turning the motion-limiting stops into the contemplated hard stops.

In the "jitter isolation mode" (Mode 2), the vibration isolator provides lower axial stiffness and a low resonance frequency (e.g., about 0.1 Hz-30 Hz) and, thus, provides excellent vibration isolation at RWA/CMG rotation speeds of, for example, 100 Hz. More specifically, when inputs to the vibration isolator are reduced, such as during normal orbital operations, the motion limiter is disengaged, and the inner spring, outer spring, and dampeners work in concert to provide the desired stiffness and dampening characteristics.

The dampener of one embodiment of the present invention is made of a viscoelastic material or tangled wire mesh that may be preloaded with the nut. The damper of another embodiment of the present invention comprises inner and outer rings separated by a viscoelastic material that is sheared or otherwise deformed to dissipate energy as the inner and outer rings move relative to each other.

Thus, it is one aspect of embodiments of the present invention to provide a vibration-isolating strut assembly, comprising: a shaft with a first end and a second end, the first end having an outwardly extending profile with a first side and a second side; a first end fitting with a cavity that accommodates the first end of the shaft, the cavity having a first face opposite the first side of the outwardly extending profile and a second face opposite the second side of the outwardly extending profile; a first stopping member positioned between the first side of the outwardly extending profile and the first face of the cavity; a second stopping member positioned between the second side of the outwardly extending profile and the second face of the cavity; a first spring having a first end associated with the first end fitting and a second end associated with the second end fitting; a second spring positioned between the shaft and the first spring; and a damper positioned between the shaft and the first spring, wherein the second spring and the damper are configured for direct mechanical communication.

It is another aspect of embodiments of the present invention to provide a vibration-isolating strut assembly, comprising: a shaft with a first end and a second end, the first end having an outwardly extending profile; a first end fitting with a cavity that accommodates the first end of the shaft; a stop associated with the outwardly extending profile; a first biasing member having a first end associated with the first end fitting and a second end associated with the second end fitting; a second biasing member positioned between the shaft and the first biasing member; and a damper positioned between the shaft and the first biasing member, wherein the second biasing member and the damper are configured for direct mechanical communication.

It is yet another aspect of embodiments of the present invention to provide a vibration-isolating strut assembly, comprising: a shaft with a first end and a second end, the first end having an outwardly extending profile with a first side and a second side; a first end fitting with a cavity that accommodates the first end of the shaft, the cavity having a first face opposite the first side of the outwardly extending profile and a second face opposite the second side of the outwardly extending profile; a first stopping member positioned between the first side of the outwardly extending profile and the first face of the cavity; a second stopping member positioned between the second side of the outwardly extending profile and the second face of the cavity; a first spring having a first end associated with the first end fitting and a second end associated with the second end fitting, the first spring having an inwardly extending protrusion spaced from the second end of the first spring, the inwardly extending protrusion abutting the first end of the damper; a second spring positioned between the shaft and the first spring, a first end of the second spring forming a portion of the first end fitting comprising the second face of the cavity; a damper positioned between the shaft and the first spring, wherein the second spring and inwardly extending protrusion are configured for direct mechanical communication with a first end of the damper, the damper further comprising: an inner sleeve that engages the shaft, wherein a first end of the inner sleeve engages the second end of the second spring and an opposite end of the inner sleeve contacts the nut, an outer sleeve that engages an inner surface of the first spring, wherein a first end of the outer sleeve engages a face of the inwardly extending protrusion, a viscoelastic material positioned between the inner sleeve and the outer sleeve; a nut received on the shaft that secures the damper against the inwardly extending protrusion, wherein a second end of the outer sleeve and a second end of the inner sleeve contact the nut, and wherein the inwardly extending protrusion abuts the first end of the damper; and a ring positioned about the nut, wherein the second end of the first spring engages at least one of the damper and the ring.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention provided herein, serve to explain the principles of these inventions.

Figure 1:
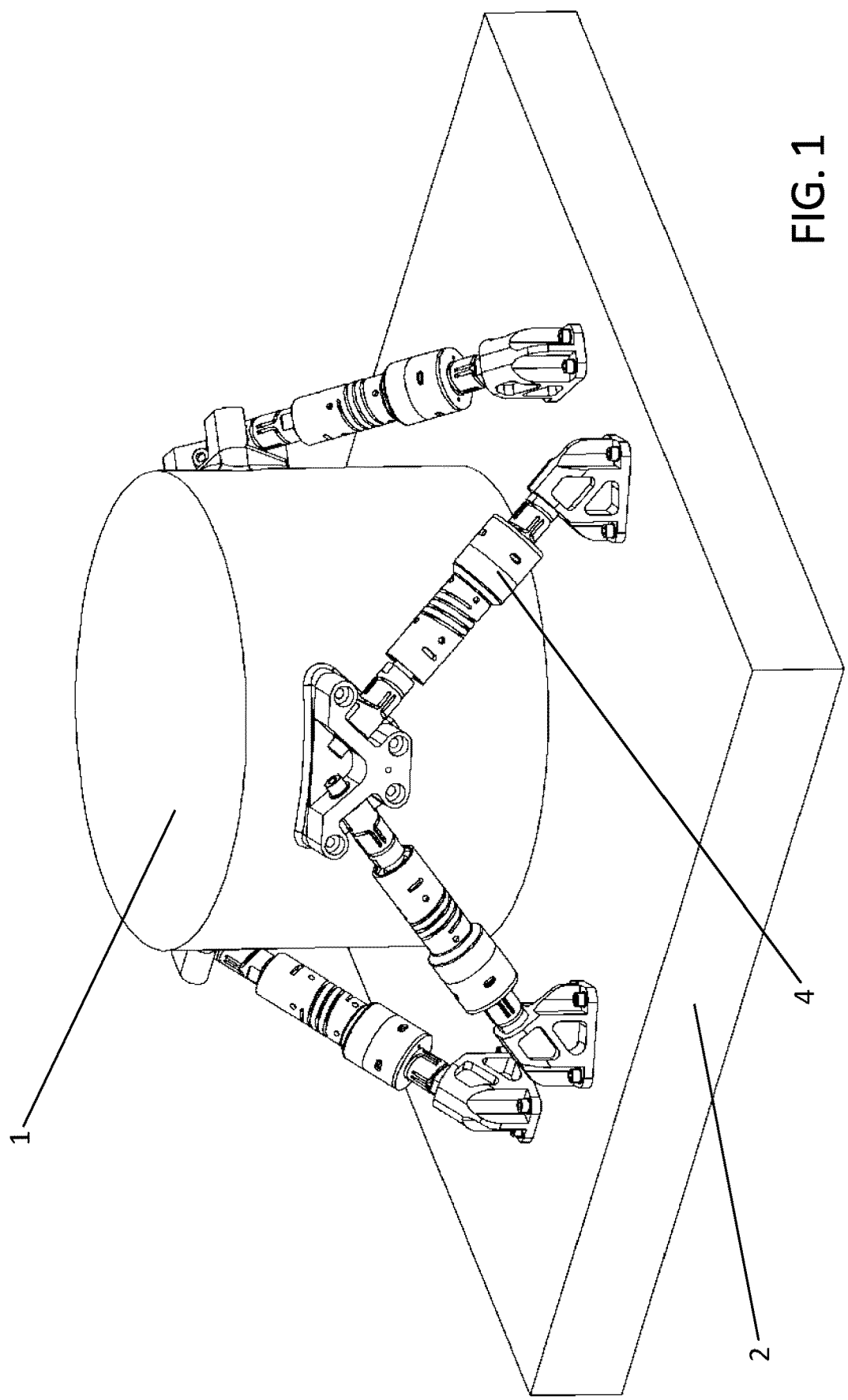
FIG. 1 is an example of a spacecraft component supported by a plurality of vibration isolators.
Figure 2:
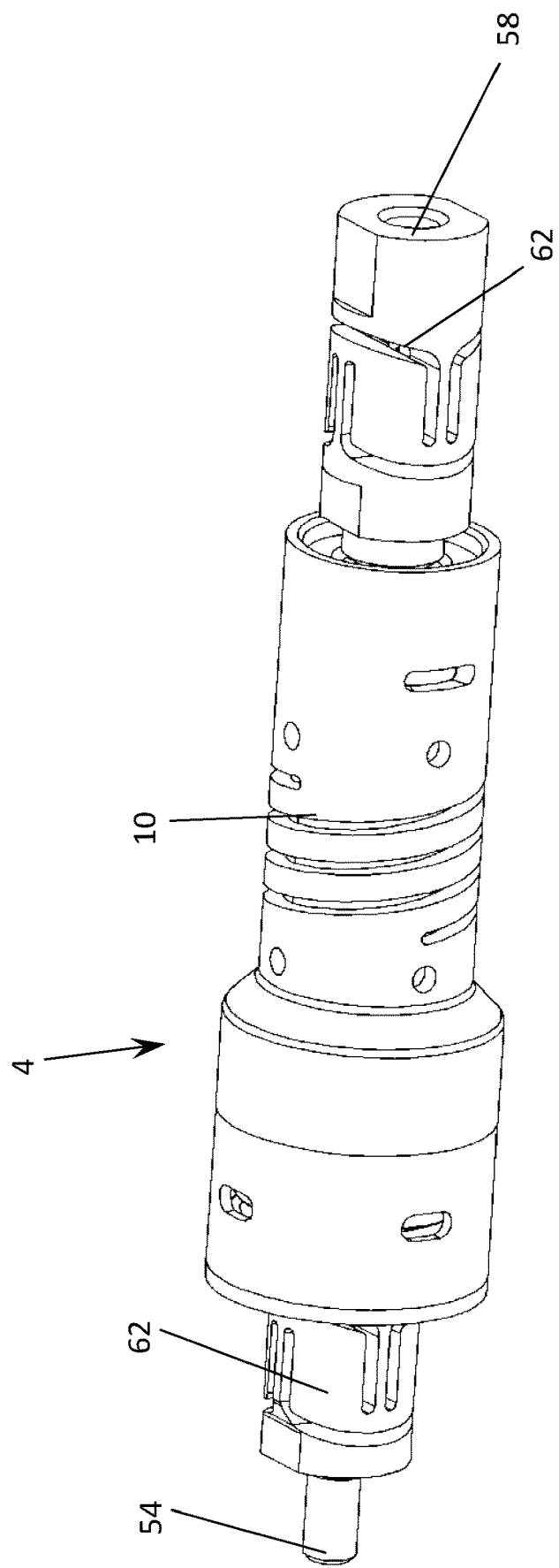
FIG. 2 is a perspective view of a vibration isolator of one embodiment of the present invention.
Figure 3:
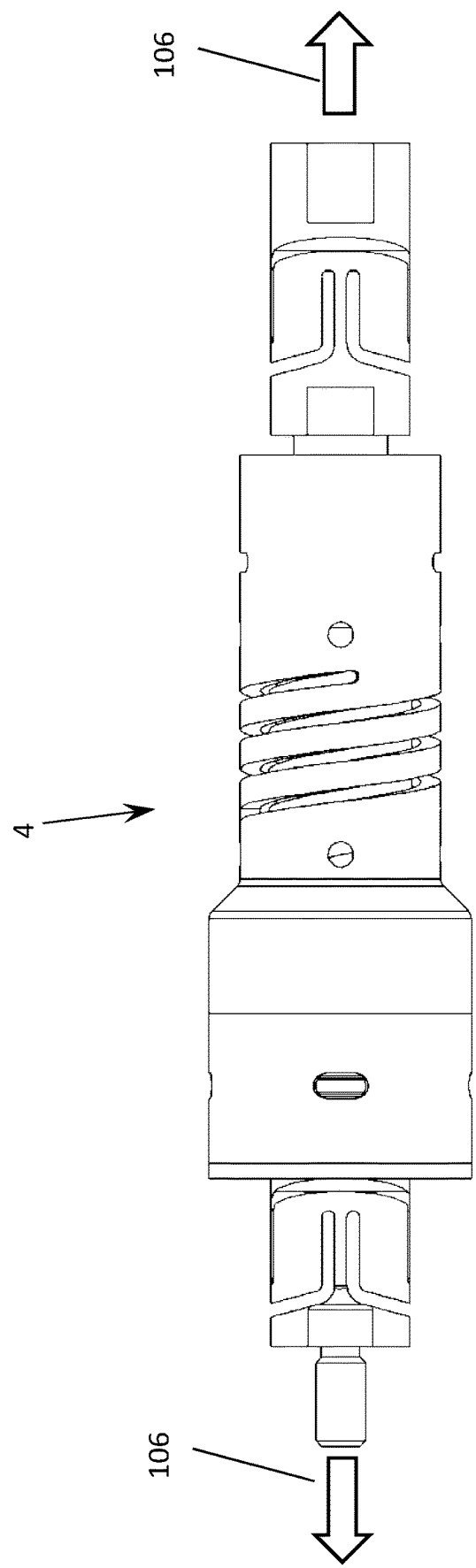
FIG. 3 is a front elevation view of the vibration isolator of FIG. 2.
Figure 4:
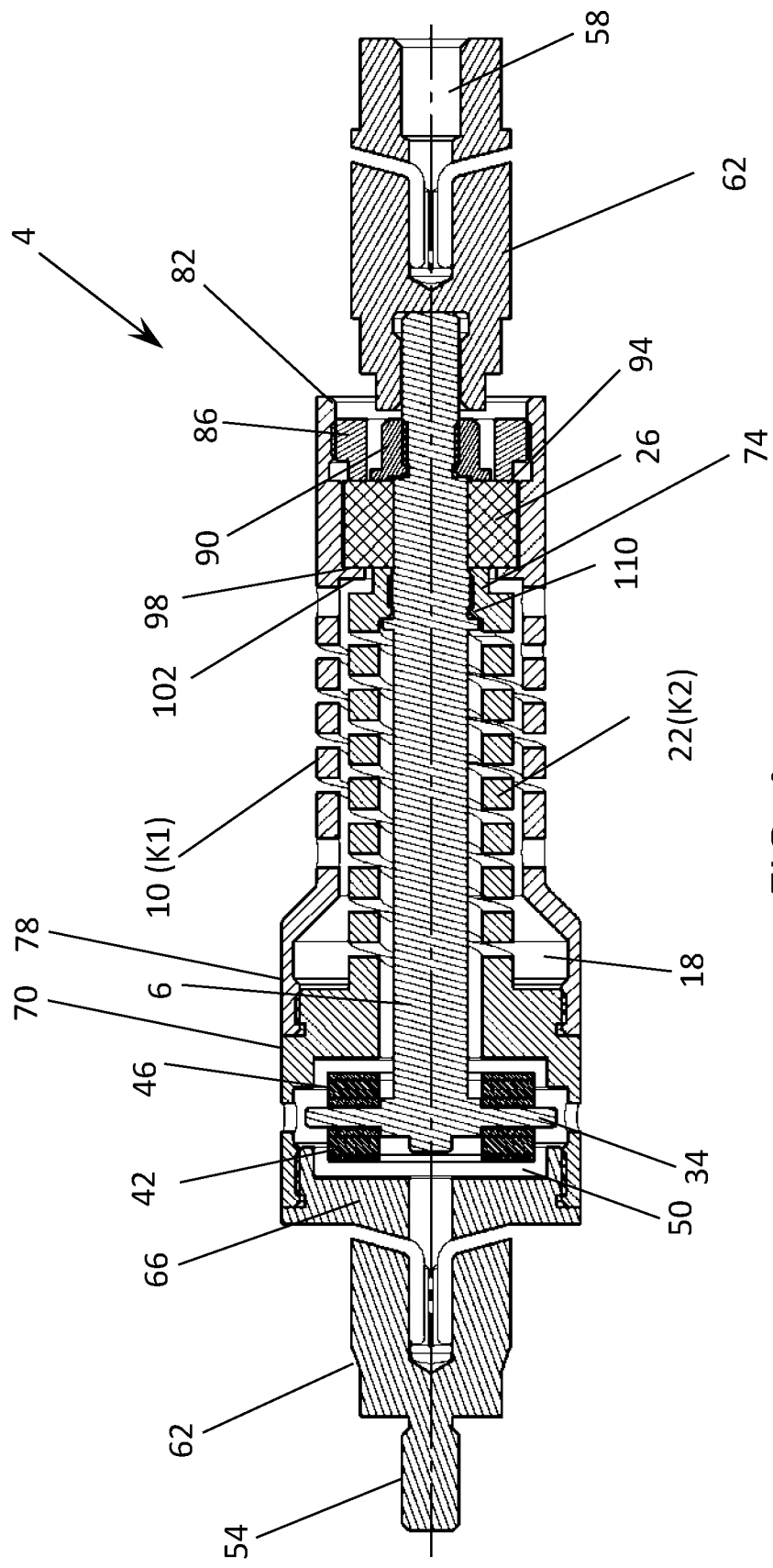
FIG. 4 is a cross-sectional view of FIG. 3.

The following component list and associated numbering found in the drawings is provided to assist in the understanding of one embodiment of the present invention:

| # | Component |
| --- | --- |
| 1 | Spacecraft Component |
| 2 | Spacecraft |
| 4 | Vibration Isolator |
| 6 | Shaft |
| 10 | Outer spring |
| 18 | Annulus |
| 22 | Inner spring |
| 26 | Damper |
| 28 | Overload protection device |
| 30 | Shaft first end |
| 34 | Outwardly extending member |
| 38 | Shaft second end |
| 42 | First stop |
| 46 | Second stop |
| 50 | Cavity |
| 54 | First end fitting |
| 58 | Second end fitting |
| 62 | Flexure |
| 64 | Load |
| 66 | End cap |
| 70 | Inner spring first end |
| 74 | Inner spring second end |
| 78 | Outer spring first end |
| 82 | Outer spring second end |
| 86 | Clamp ring |
| 90 | Nut |
| 94 | Damper second face |
| 98 | Damper first face |
| 102 | Inwardly extending protrusion |
| 106 | Axial direction |
| 110 | Outwardly extending protrusion |
| 114 | Cavity first end face |
| 118 | Cavity second end face |
| 122 | Outer extent |
| 126 | Hard stop |
| 130 | Inner sleeve |
| 134 | Outer sleeve |
| 138 | Viscoelastic material |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 5A:
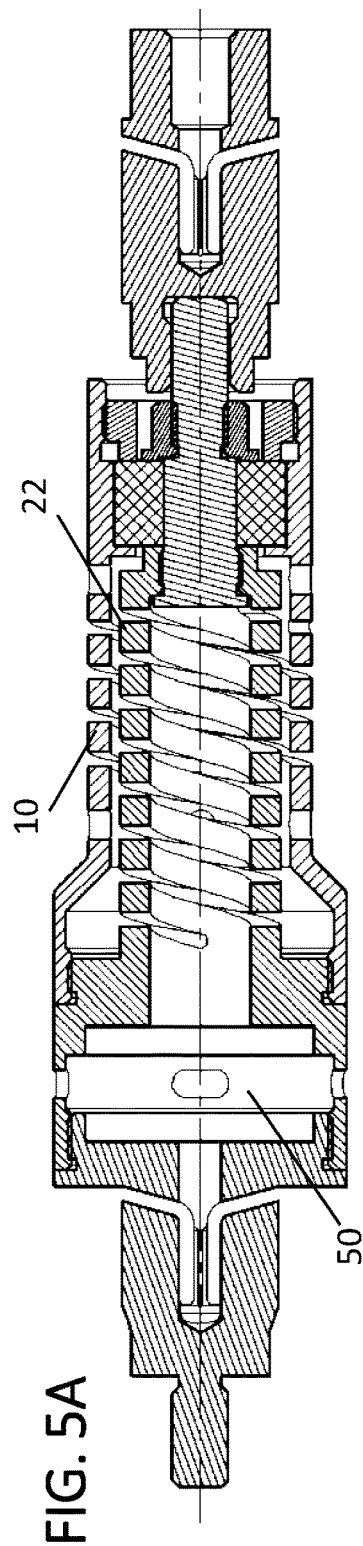
FIG. 5A is a cross-sectional view of the vibration isolator, wherein a portion of a shaft has been removed for clarity.
Figure 5B:
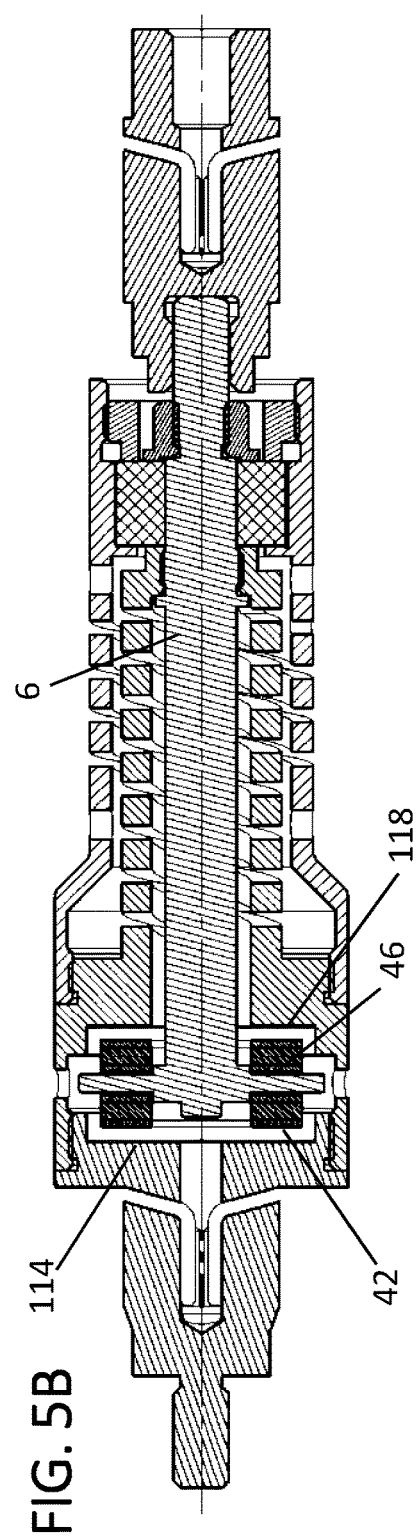
FIG. 5B is a cross-sectional view of the vibration isolator in a relaxed state or exposed to loads of a third character.
Figure 5C:
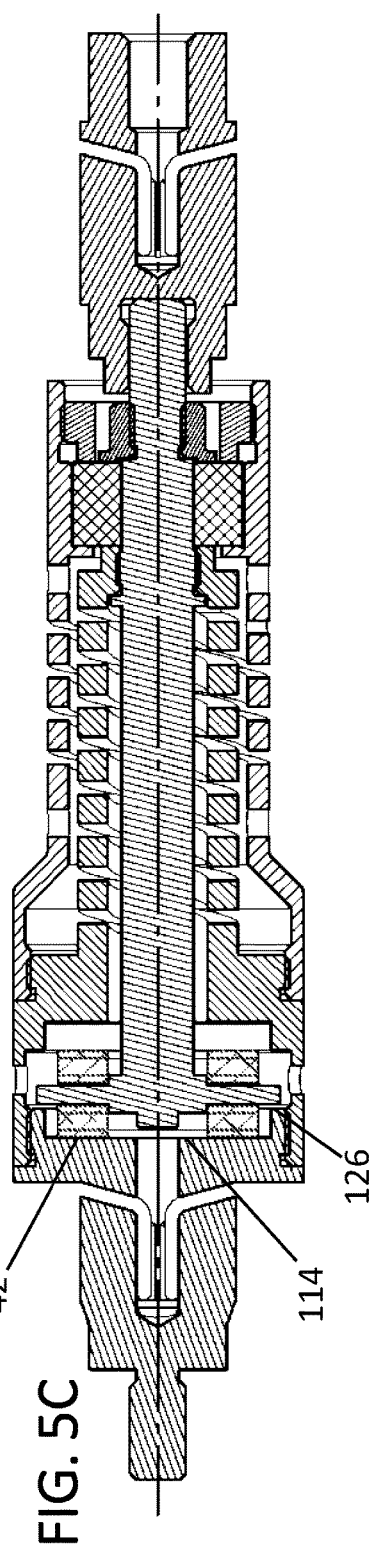
FIG. 5C is a cross-sectional view of the vibration isolator exposed to loads of a first character.
Figure 6:
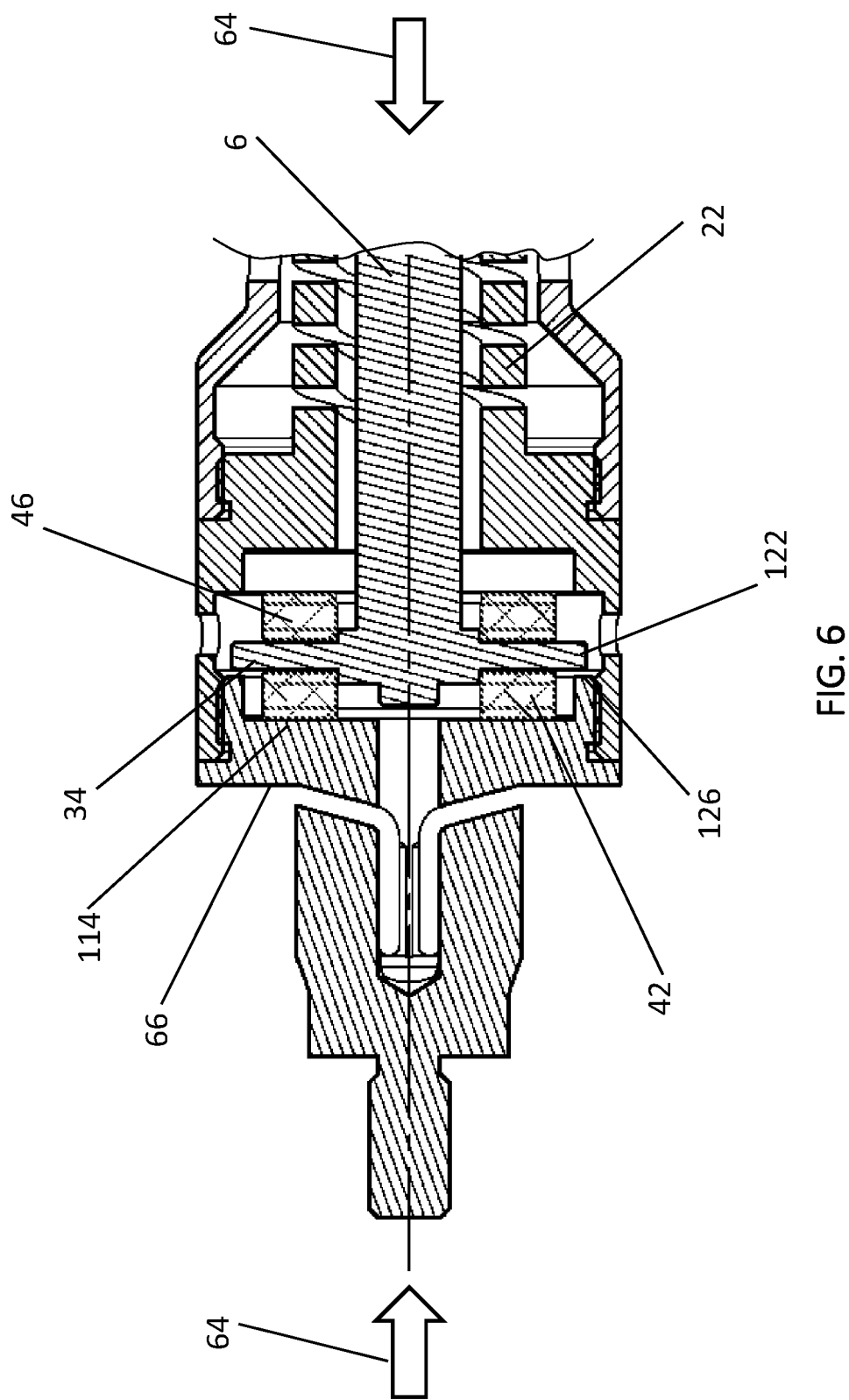
FIG. 6 is a detailed cross-sectional view showing an overload protector.
Figure 7:
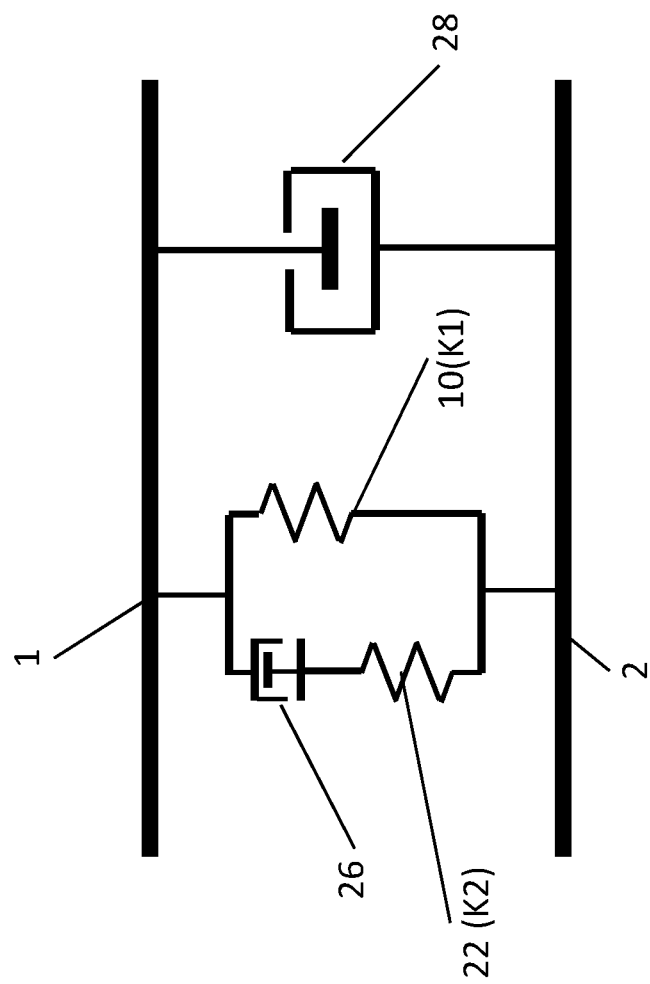
FIG. 7 is a schematic view of the vibration isolator of one embodiment of the present invention.

FIGS. 1-8 show a spacecraft component 1 interconnected to a spacecraft 2 by a plurality of vibration isolators 4. The vibration isolators 4 of one embodiment of the present invention generally consists of a shaft 6 associated with a plurality of springs and/or dampers. More specifically, an outer spring 10 is positioned about a portion of the shaft, 6, which defines an annulus 18 between the outer spring 10 and the shaft 6. The shaft carries large loads (vibration and acceleration) under certain circumstances. The annulus 18 accommodates an inner spring 22 and a damper 26 interconnected in a series relationship. Here, the inner spring 22 is in parallel with the outer spring 10 and the damper 26. FIG. 7 is a schematic of this arrangement that also shows an overload protection device 28 employed by some embodiments, which will be described in detail below.

The shaft 6 comprises a first end 30 that has an outwardly extending member 34, which may be comprised by a disk-shaped element, and a second end 38. The outwardly extending member 34 accommodates a first stop 42 positioned on one side of the outwardly extending member 34 and a second stop 46 positioned on the opposite side of the outwardly extending member 34. The stop of one embodiment is made by joining one layer of rubber or viscoelastic energy absorbing material between two metal layers. The outwardly extending member 34 of the shaft and the associated stops are positioned in a cavity 50 positioned a first end fitting 54. The second end 38 is interconnected to a second end fitting 58. The end fittings may be threaded or tapped features, but a variety of other mechanical interfaces could work equally well. The end fittings may include a flexure 62 to reduce stiffness in the lateral direction, wherein the end fittings couple load 64 (see, FIG. 6) from the flexures to the vibration isolator's longitudinal axis.

The first end fitting 54 may also comprise a removable end cap 66 that provides access to the cavity 50. Here, the end cap 66 is interconnected to a first end 70 of the inner spring 30 and a second end 74 of the inner spring 30 is engaged onto the damper 26. A first end 78 of the outer spring 10 is also interconnected to the inner spring first end 70, wherein a second end 82 of the outer spring 10 contacts the damper 26. The second end 82 of the outer spring 10 is secured in one embodiment of the present invention by a clamp ring 86 that surrounds a nut 90 interconnected to the shaft. The clamp ring 86 abuts a second face 94 of the damper 26, wherein the first face 98 of the damper 26 is engaged on an inwardly extending protrusion 102 provided by the outer spring 10. The clamp ring 86, nut, and inwardly extending protrusion 102, thus, maintain the position of the dampener 26 along the axial direction 106 (see, FIG. 3) of the vibration isolator 4. In one embodiment, the second end 82 of the outer spring 10 is threateningly engaged onto the clamp ring 86. The shaft 6 may also provide an outwardly extending protrusion 110 provided between the first end 30 and the second end 38 that acts as a joint that engages a portion of the inner spring 22 near its second end 74.

FIGS. 5 and 6 illustrate how one embodiment of the present invention functions. FIG. 5A shows the vibration isolator in an undisturbed state or subject to a load of a third character mentioned above (e.g., 0.1 Hz-30 Hz), wherein the outwardly extending portion 34 of the shaft 6 is generally positioned within the center of the cavity 50. FIG. 5C shows the vibration isolator 4 when it is exposed to an axial load of the first character (e.g., about 40-350 lbf). Here, a compressive load along the vibration isolator's axis 106 urges the first end 30 of the shaft 6 towards the first end face 114 of the cavity 50. The first stop 42 is shown compressed between the outwardly extending portion 34 of the shaft 6 and the cavity face. Compressive forces are absorbed primarily by the first stop 42, but also by the dampener 26, outer spring 10, and inner spring 22. A tension load would urge the first end 30 of the shaft in the opposite direction, thereby engaging the second stop 46 onto a second face 118 of the cavity. In the event of an extreme load, e.g., the axial load of a second character (e.g., greater than about 350 lbf), an outer extent 122 of the outwardly-extending member 34 would contact a hard stop 126 provided by the end cap 66 (or the inner spring first end in the case of tension), which would compress the first stop 42 and engaged the outer extent 122 onto the hard stop 126 to cease shaft travel.

FIG. 7 is a graphical representation of the system of one embodiment of the present invention. Those of ordinary skill in the art will appreciate that although one dampener 26 and two springs are shown, some embodiments of the present invention may employ a plurality of dampeners and more than two springs. In one embodiment, the outer spring 10 and the inner spring 22 possesses different stiffnessed, wherein the spring stiffness of the outer spring is typically greater than the spring stiffness of the inner spring. Providing an arrangement wherein the outer spring 10 is in series with the damper 26 permitting greater allowable strut stroke because displacement is split between these components. A greater allowable strut stroke permits reduction of the jitter isolation stiffness by increasing the size of the motion limiting gap, which cannot be allowed to close during nominal operation. Dampers with viscoelastic components may require load splitting to prevent damage to the viscoelastic material during loading of the first character. Load splitting may not be necessary for dampers without axial stoke limits.

Figures 8A, 8B:
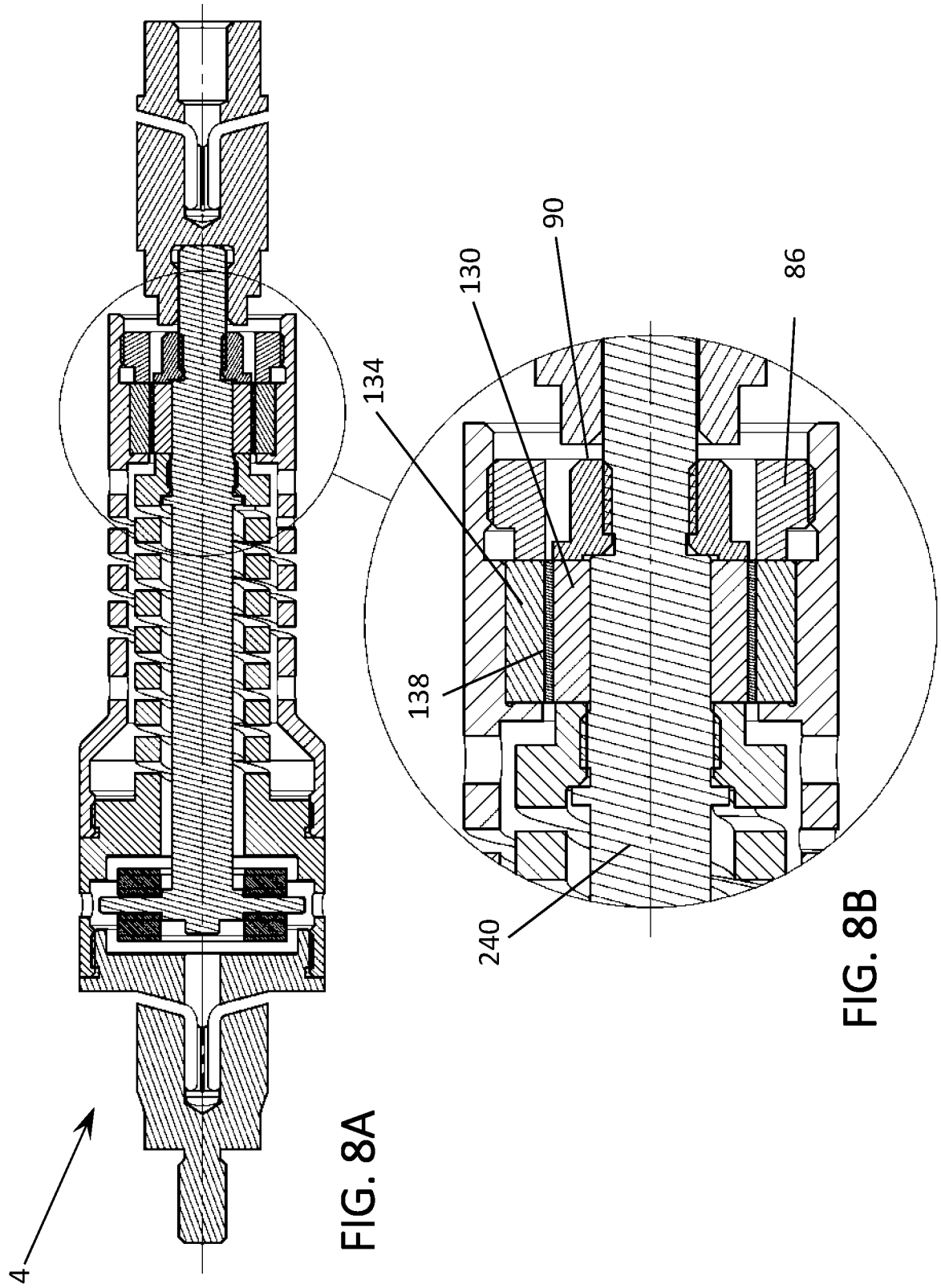
FIG. 8A is a cross-sectional view of a vibration isolator with a damper employing a viscoelastic material.
FIG. 8B is a detailed view of FIG. 8A.

The dampener of one embodiment comprises a wire mesh or viscoelastic material. One type of viscoelastic dampener contemplated is shown in FIG. 8. Here, the damper 26 employs and inner sleeve 130 that is associated with the outer surface of the shaft and an outer sleeve 134 spaced from the inner sleeve with the viscoelastic material 138 positioned therebetween. The inner sleeve 130 contacts the second end 74 of the inner spring 22 and the nut 90. The outer sleeve is sandwiched between the inward-extending protrusion 102 of the outer spring 10 and the clamp ring 86, which allows the outer sleeve 134 to move relative to the fully captured inner sleeve 130. Movement of the outer sleeve 134 relative to the inner sleeve 130 thus, creates a dampening, energy compensating shear load. The inner sleeve may possess an outer surface optimized to adhere to the viscoelastic material. The thickness, surface area, and length of the viscoelastic material will determine its stiffness and dampening properties. Finally, the outer sleeve may be manufactured from multiple arc-segments that are radially urged onto the viscoelastic material to ensure high pre-compression.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A vibration-isolating strut assembly, comprising:
   a shaft with a first end and a second end, the first end having an outwardly extending profile with a first side and a second side;
   a first end fitting with a cavity that accommodates the first end of the shaft, the cavity having a first face opposite the first side of the outwardly extending profile and a second face opposite the second side of the outwardly extending profile;

a first stopping member positioned between the first side of the outwardly extending profile and the first face of the cavity;

a second stopping member positioned between the second side of the outwardly extending profile and the second face of the cavity;

a first spring having a first end directly interconnected to the first end fitting and a second end associated with a second end fitting;

a second spring positioned between the shaft and the first spring;

a damper positioned between the shaft and the first spring, wherein the second spring and the damper are configured for direct mechanical communication;

wherein the strut assembly is devoid of bellows; and wherein the damper comprises an inner sleeve engaged onto the shaft, an outer sleeve that contacts the first spring, and a viscoelastic material positioned between the inner sleeve and the outer sleeve.

2. The strut assembly of claim 1, wherein at least one of the first end fitting and the second end fitting comprises a flexure that provides flexibility about at least one axis that is generally perpendicular to a longitudinal axis of the strut assembly.

3. The strut assembly of claim 1, wherein the stiffness of the first spring is greater than the stiffness of the second spring.

4. The strut assembly of claim 1, wherein the first end fitting further comprises a hard stop extending from the first face of the cavity.

5. The strut assembly of claim 4, wherein:

a load of a first character is accommodated primarily by the first spring and the damper, wherein the first stopping member is urged against the first face of the cavity;

a load of a second character is accommodated primarily by the first spring, wherein the first stopping member is urged against the first face of the cavity and the outwardly extending profile of the shaft is urged against the hard stop; and a load of a third character is accommodated by the first spring, the second spring, and the damper, wherein the first stopping member and the second stopping member do not contact the first and second faces of the cavity.

6. The strut assembly of claim 5, wherein the strut assembly is configured to be assembled into a configuration with an actuator or a payload that has a resonant frequency of over about 20-100 Hz when exposed to the load of the first character and the second character, and about 0.1-30 Hz when exposed to the load of the third character.

7. The strut assembly of claim 1, wherein a first end of the second spring forms a portion of the first end fitting comprising the second face of the cavity, and wherein a second end of the second spring engages a first end of the damper;

wherein the first spring has an inwardly extending protrusion spaced from the second end of the first spring, the inwardly extending protrusion abutting the first end of the damper; and further comprising:

a nut received on the shaft that secures the damper against the inwardly extending protrusion, and a ring positioned about the nut, wherein the second end of the first spring engages at least one of the damper and the ring.

8. A vibration-isolating strut assembly, comprising:

a shaft with a first end and a second end, the first end having an outwardly extending profile;

a first end fitting with a cavity that accommodates the first end of the shaft;

a first stop associated with the outwardly extending profile;

a first biasing member having a first end directly interconnected to the first end fitting and a second end associated with a second end fitting;

a second biasing member positioned between the shaft and the first biasing member;

a damper positioned between the shaft and the first biasing member, wherein the second biasing member and the damper are configured for direct mechanical communication;

wherein the strut assembly is devoid of bellows; and wherein the damper comprises an inner sleeve engaged onto the shaft, an outer sleeve that contacts the first biasing member, and a viscoelastic material positioned between the inner sleeve and the outer sleeve.

9. The strut assembly of claim 8, wherein at least one of the first end fitting and the second end fitting comprises a flexure that provides flexibility about at least one axis that is generally perpendicular to a longitudinal axis of the strut assembly.

10. The strut assembly of claim 8, wherein the stiffness of the first biasing member is greater than the stiffness of the second biasing member.

11. The strut assembly of claim 8, wherein the first biasing member comprises at least one spring, and wherein the second biasing member comprises at least one spring.

12. The strut assembly of claim 8, wherein the first end fitting further comprises a second stop;

wherein a load of a first character is accommodated primarily by the first stop and the shaft, wherein the first stop is urged against a cavity surface;

wherein a load of a second character is accommodated primarily by the shaft, wherein the first stop is urged against the cavity surface and the outwardly extending profile of the shaft is urged against the second stop; and wherein a load of a third character is accommodated by the first biasing member, the second biasing member, and the damper.

13. A vibration-isolating strut assembly, comprising:

a shaft with a first end and a second end, the first end having an outwardly extending profile with a first side and a second side;

a first end fitting with a cavity that accommodates the first end of the shaft, the cavity having a first face opposite the first side of the outwardly extending profile and a second face opposite the second side of the outwardly extending profile;

a first stopping member positioned between the first side of the outwardly extending profile and the first face of the cavity;

a second stopping member positioned between the second side of the outwardly extending profile and the second face of the cavity;

a first spring having a first end associated with the first end fitting and a second end associated with a second end fitting, the first spring having an inwardly extending protrusion spaced from the second end of the first spring;

a second spring positioned between the shaft and the first spring, a first end of the second spring forming a portion of the first end fitting comprising the second face of the cavity;

a damper positioned between the shaft and the first spring, wherein the second spring and inwardly extending protrusion are configured for direct mechanical communication with a first end of the damper, the damper further comprising:
- an inner sleeve that engages the shaft, wherein a first end of the inner sleeve engages a second end of the second spring,
- an outer sleeve that engages an inner surface of the first spring, wherein a first end of the outer sleeve engages a face of the inwardly extending protrusion,
- a viscoelastic material positioned between the inner sleeve and the outer sleeve;

a nut received on the shaft that secures the damper against the inwardly extending protrusion, wherein a second end of the outer sleeve and a second end of the inner sleeve contact the nut, and wherein the inwardly extending protrusion abuts the first end of the damper; and a ring positioned about the nut, wherein the second end of the first spring engages at least one of the damper and the ring.

* * * * *